US 6,993,976 B2
United States Patent
Fessele et al.

(10) Patent No.: US 6,993,976 B2
(45) Date of Patent: Feb. 7, 2006

(54) PRESSURE MEASURING DEVICE

(75) Inventors: Thomas Fessele, Nagold (DE); Hans-Martin Hochenberger, Schwieberdingen (DE); Winfried Kuhnt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 10/466,392

(22) PCT Filed: Feb. 19, 2003

(86) PCT No.: PCT/DE03/00501

§ 371 (c)(1),
(2), (4) Date: Jul. 15, 2003

(87) PCT Pub. No.: WO03/100371

PCT Pub. Date: Dec. 4, 2003

(65) Prior Publication Data
US 2005/0103115 A1 May 19, 2005

(30) Foreign Application Priority Data
May 25, 2002 (DE) ............................... 102 23 357

(51) Int. Cl.
*G01L 7/00* (2006.01)
(52) U.S. Cl. .................................. 73/756; 73/716
(58) Field of Classification Search .............. 73/716, 73/756

See application file for complete search history.

(56) References Cited

U.S. PATENT DOCUMENTS

| 4,343,180 A | * | 8/1982 | Herden et al. ............... 73/717 |
| 4,708,012 A | * | 11/1987 | Folk et al. .................. 73/1.61 |
| 4,850,227 A | * | 7/1989 | Luettgen et al. ............. 73/756 |
| 5,747,694 A | | 5/1998 | Baba |
| 6,575,038 B1 | * | 6/2003 | Takakuwa et al. ........... 73/756 |
| 6,813,953 B2 | * | 11/2004 | Baba et al. .................. 73/715 |
| 2002/0095973 A1 | * | 7/2002 | Cole .......................... 73/1.57 |

FOREIGN PATENT DOCUMENTS

| DE | 197 31 420 A | 1/1999 |
| DE | 199 61 776 A | 12/2000 |

* cited by examiner

*Primary Examiner*—William Oen
*Assistant Examiner*—Alandra Ellington
(74) *Attorney, Agent, or Firm*—Michael J. Striker

(57) ABSTRACT

A device for measuring pressure includes a housing 9 in which a carrier 3 equipped with a sensor element 31 and electrical connection elements 34 is located. The housing 9 is made up of a first housing chamber 4 that encloses the sensor element 31 and is connected with a first pressure channel 13 of a first pressure connection 12. The housing also includes a second housing chamber 5 that is sealed off from the first housing chamber 4 and encloses at least the electrical connection elements 34. The housing 9 has a third housing chamber 6 that is sealed off from the first housing chamber 4 and the second housing chamber 5. The third housing chamber is connected with a second pressure channel 11 of a second pressure connection 10.

12 Claims, 4 Drawing Sheets

PRESSURE MEASURING DEVICE

BACKGROUND OF THE INVENTION

The invention relates to a device for measuring pressure

A device of this type for measuring pressure is made known in DE 197 31 420 A1, for example. The device shown therein is used to measure pressure in the intake manifold of an internal combustion engine and comprises a carrier configured as a hybrid plate that is located in a housing. A first housing chamber provided as a pressure chamber—in which a sensor element situated on the carrier is located—is capable of being connected with the intake manifold via a pressure connection, and it is sealed off from the surroundings and a second housing chamber by means of an adhesive. Bonding wires are situated in the second housing chamber provided as a bonding space, which said bonding wires connect the carrier with a male connector in electrical fashion.

SUMMARY OF THE INVENTION

The device according to the invention for measuring pressure is capable of being used advantageously in new fields of application, such as measurement of exhaust-gas pressure, which is of great significance for the introduction of a particle filter for diesel engines. Advantageously, the sensor concept used previously only for absolute pressure sensors with the decoupling of mechanical stresses by means of seal bonds, and having the simple, two-component housing construction that is economical to fabricate is now available for use to measure pressure differential as well. It is particularly advantageous that production can take place on existing manufacturing machines, and only a few bonding steps are required. In addition to the first housing chamber and the second housing chamber, the device according to the invention comprises a third housing chamber that is sealed off from the first housing chamber and the second housing chamber, and that is connected with a second pressure channel of a second pressure connection. Through a recess in the carrier underneath the sensor element, said sensor element can be acted upon by the pressure prevailing in the third housing chamber, and the device can be used to measure a pressure differential.

An exemplary embodiment that is particularly easy to fabricate provides that the third housing chamber is delineated by a side of the carrier furthest from the sensor element and the interior wall of a recess that is formed on an inner side of the first housing part closest to the carrier and that is interconnected with the second pressure channel or forms said pressure channel.

Advantageously, the first pressure connection and the second pressure connection can be formed on the first housing part, so that the second housing part can be configured as a simple cover part.

Advantageously, a first seal can be located between the inside of the first housing part closest to the carrier and the side of the carrier furthest away from the sensor element, which said seal seals off the third housing chamber from the first housing chamber. A second seal is located in the contact area of the first housing part and the second housing part, which said seal seals off the first housing chamber from the second housing chamber, whereby the second seal comprises a circumferential sealing section in the contact area of the first housing part and the second housing part, and an inner sealing section that overlaps the circumferential sealing section in the manner of a bridge, which said inner sealing section seals off the transition region between the carrier and a separating wall that is formed on the second housing part and separates the first housing chamber from the second housing chamber. It is advantageous that the two seals seal off three housing chambers from each other at once. A costly, layered design of the housing in which the second pressure connection is located on the second housing part is advantageously avoided.

The first seal and/or the second seal can each be formed by a seal bond and, in particular, by a bead of adhesive. Advantageously, the first seal bond and/or the second seal bond are each located substantially in one plane. This prevents the adhesive from running immediately after it is applied during the two bonding steps.

It is furthermore particularly advantageous to locate EMC-protective capacitors—which ensure electromagnetic compatibility (EMC)—on the carrier in order to prevent short-circuits inside the second housing chamber, since a smaller amount of exhaust-gas condensate collects here than in the first housing chamber. This is particularly advantageous when the device for measuring exhaust-gas pressure is connected by a connection line with the exhaust-gas system, and larger amounts of exhaust-gas condensate condense in the first housing chamber.

BRIEF DESCRIPTION OF THE DRAWINGS

Exemplary embodiments of the invention are presented in the drawings and are described in the description hereinbelow.

DETAILED DESCRIPTION OF THE PREFERRED EMBODIMENTS

Figure 1B:
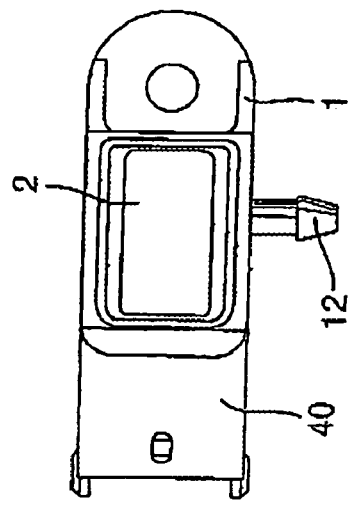
FIG. 1b is a top view of the device in FIG. 1a, FIGS. 2 through 7 show various steps in the production of a second exemplary embodiment of the device according to the invention.
Figure 1A:
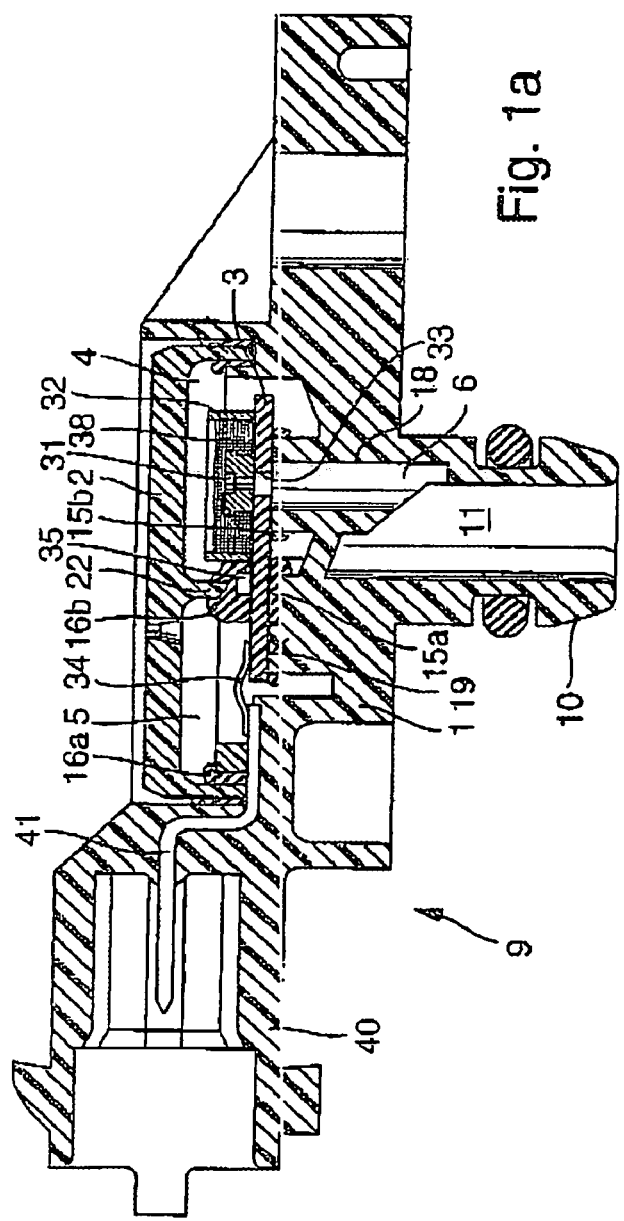
FIG. 1a is a cross-sectional view through a first exemplary embodiment of the device according to the invention.

FIG. 1a shows a cross-sectional view through a first exemplary embodiment of a device, according to the invention, for measuring pressure that is configured as a pressure differential sensor and comprises a two-component housing 9 having a first housing part 1 and a second housing part 2 that forms a cover part that is capable of being placed on the first housing part. A connector 40 is formed on the first housing part 1, the contact elements 41 of which are guided into the interior of the housing, where a ceramic hybrid plate 3 is located, said ceramic hybrid plate serving as the carrier of the actual sensor element 31. The sensor element 31 can be a silicon-based semiconductor pressure sensor equipped with a sensor membrane, for example, that is attached to the carrier 3 in a known manner by means of a glass base 38. Bonding wires contact the sensor element 31 with conductive tracks of the carrier 3. Additional electrical/electronic components can be situated on the carrier as well. A frame 32 is placed around the sensor element 31 on the carrier 3, which said frame is filled with a fluorosilicone gel as a protective gel, for example, to protect the sensor element 31 from aggressive substances. The electrical connections 34 of the carrier that are connected with the conductive tracks are contacted with the contact elements 41 of the connector 40 by means of bonding wires.

As shown in FIG. 1b, a column-shaped, first pressure connection 12 is attached to the side. A pressure channel that extends in the pressure connection 12 and that is not shown in FIGS. 1a and 1b opens into a first housing chamber 4 that is located between the first housing part 1 and the second housing part 2. The pressure prevailing in the first housing chamber 4 acts on the membrane of the sensor element 31 through the protective gel. A separating wall 22 formed on the second housing part 2 separates a second housing chamber 5 from the first housing chamber 4. The electrical connecting elements of the carrier 3 with the bonding wires 34 are located in the second housing chamber 5. A second, column-shaped pressure connection 10 comprises a pressure channel 11 that is interconnected with a recess that is formed in an inner side 19 of the first housing part that is closest to the carrier 3. A third housing chamber 6 is formed by the underside of the carrier 3 that is closest to the inner side 19, and the interior wall 18 of said recess. Through an opening 33 provided in the carrier 3 and a cylindrical opening in the glass base 38, the underside of the pressure-sensitive membrane of the sensor element 31 closest to the carrier 3 is acted upon by the pressure existing in the third housing chamber 6, so that the pressure differential between the first housing chamber 4 and the third housing chamber 6 is detected by the sensor element 31. The three housing chambers are sealed off from each other by means of seal bonds 15 and 16. The production of said seal bonds will be presented hereinbelow with reference to a further exemplary embodiment of the device according to the invention.

Figure 2:
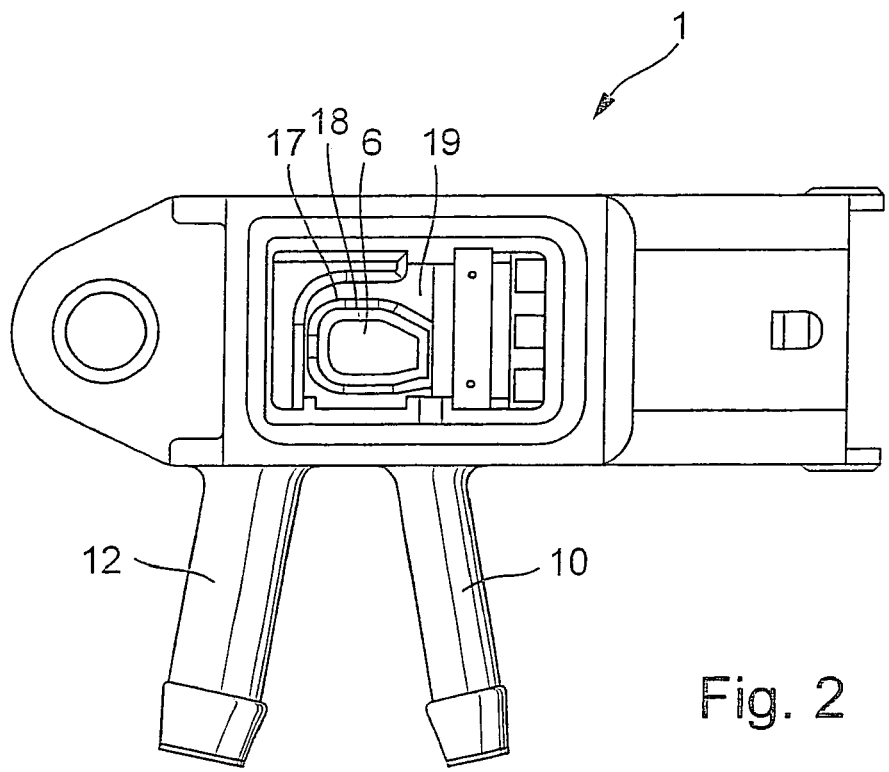
Figure 3:
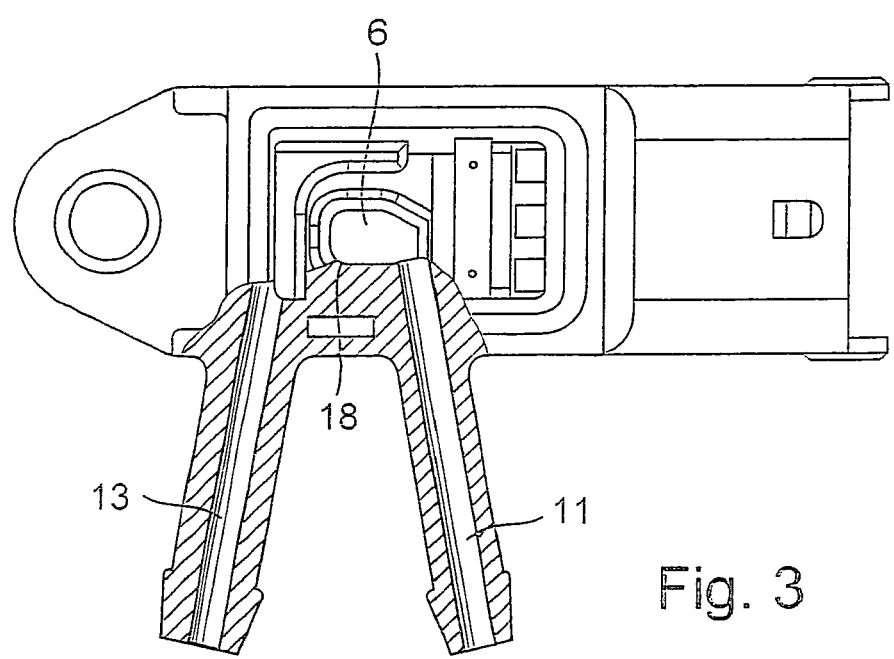
Figure 4:
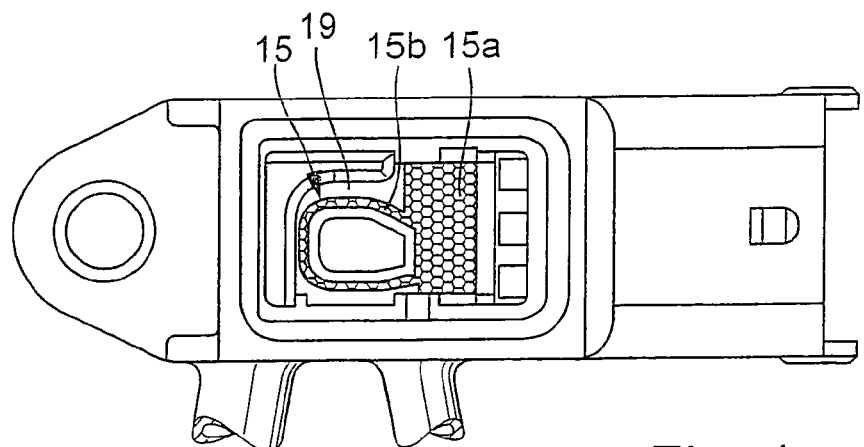
Figure 5:
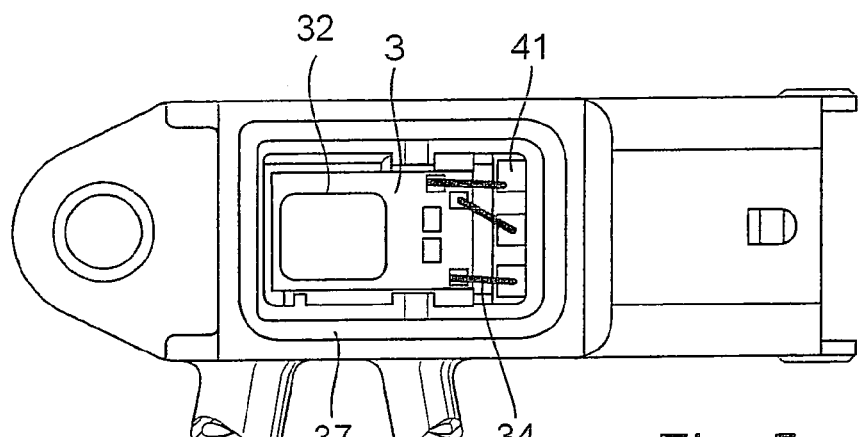
Figure 6:
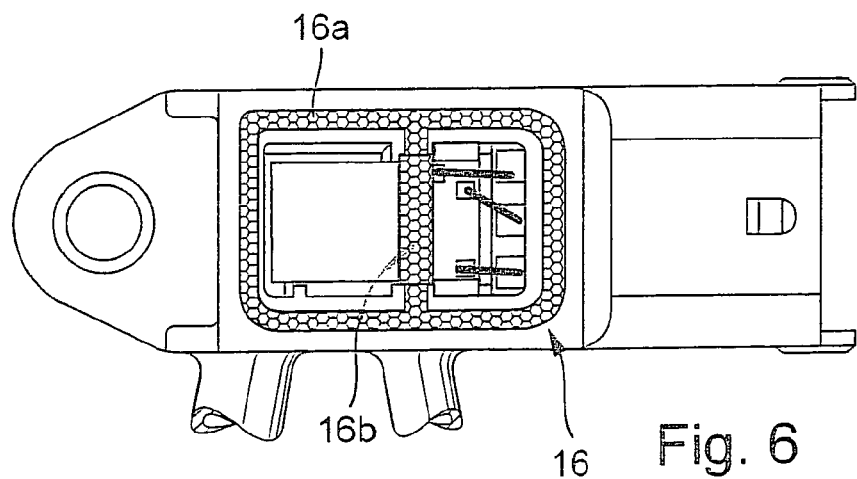
Figure 7:
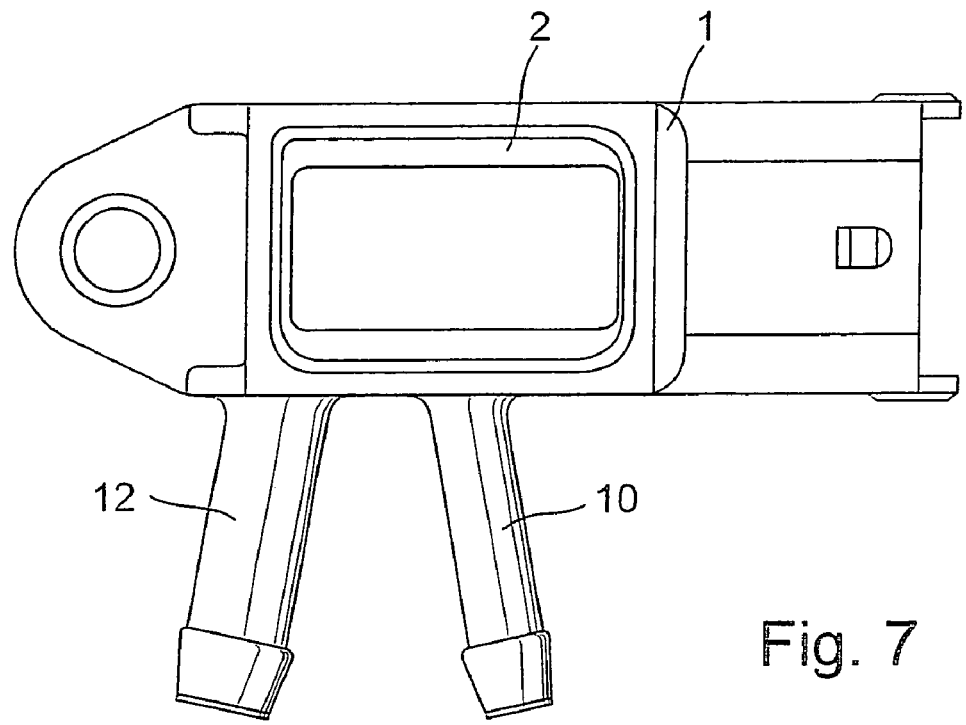
Figure 8:
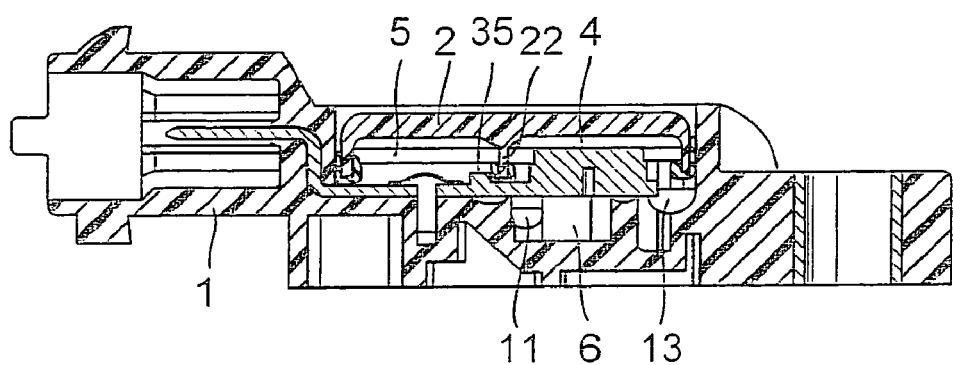
FIG. 8 is a cross-section through the second exemplary embodiment of the invention.

FIG. 2 shows a top view of the first housing part 1 of a further exemplary embodiment with the cover part 2 removed and without the carrier 3. The inner side 19 of the first housing part 1 is shown in FIG. 2, in which said inner side a recess 18 is located. A circumferential groove 17 is located around the edge of the recess 18. In this exemplary embodiment, the two connectors 10, 12 project outwardly from a common side of the first housing part 1. In the exemplary embodiment in FIG. 1a, however, said connectors are arranged at a right angle to each other. In the partial sectional drawing in FIG. 3, one can see that the first pressure channel 13 of the first pressure connection 12 is guided into the interior of the housing on the side, and the second pressure channel 11 of the second pressure connection 10 opens into the recess 18. FIG. 4 shows how, in the first production step, a bead of adhesive 15 is applied to the inner side 19 of the first housing part 1 as the first seal. A first section 15b of the bead of adhesive applied in the groove 17 surrounds the recess 18, and a further section 15a is applied directly next thereto on the inner side 19. Finally, the carrier 3 with the sensor element is placed on the adhesive, and the bonding wire connection between the connections of the carrier 3 and the contact elements 41 is completed. The recess 18 is covered by the carrier 3. The third housing chamber 6 is now sealed off from the rest of the housing interior by the section 15b of the bead of adhesive 15. As shown in FIG. 6, the second seal 16 is now produced by means of a further application of adhesive that is applied in the groove 37 and is partially applied as well to the side of the carrier 3 equipped with the sensor element 31. The second seal 16 comprises a circumferential sealing section 16a and an inner sealing section 16b that is applied to part of the carrier 3 and overlaps the circumferential sealing section 16a in the manner of a bridge. Finally, as shown in FIG. 7, the second housing part 2 is placed on the first housing part 1, forming the first housing chamber 4 and the second housing chamber 5. A separating wall 22 integrally molded on the second housing part 2 extends into the inner sealing section 16b, so that the first housing chamber 4 is sealed off from the second housing chamber 5, as shown most clearly in the cross-sectional drawing in FIG. 8. When the second housing part 2 is set in place, the circumferential sealing section 16a seals off the contact area of the first and second housing part. It is particularly advantageous that the first seal bond 15 and the second seal bond 16 are each located substantially in one plane. This prevents the adhesive from running immediately after it is applied.

The finished device comprises three housing chambers, whereby the third housing chamber 6, for example, is capable of being acted upon with a measuring pressure through the second pressure channel 11, which said measuring pressure acts on the sensor element from below, and the first housing chamber 4 is capable of being acted upon with a reference pressure through the first pressure channel 13, which said reference pressure acts on the sensor element from above. EMC-protective capacitors 35 can be advantageously situated on the carrier 3 in the second housing chamber 5, which said EMC-protective capacitors are protected there from harmful substances that condense in the first housing chamber 4, for example.

What is claimed is:

1. A device for measuring pressure having a housing (9) in which a carrier (3) equipped with a sensor element (31) and electrical connection elements (34) is located, which said housing (9) comprises a first housing chamber (4) that encloses the sensor element (31) and is connected with a first pressure channel (13) of a first pressure connection (12), and which said housing comprises a second housing chamber (5) that is sealed off from the first housing chamber (4) and encloses at least the electrical connection elements (34), wherein the housing (9) comprises a third housing chamber (6) that is sealed off from the first housing chamber (4) and the second housing chamber (5), which said third housing chamber is interconnected with a second pressure channel (11) of a second pressure connection (10), wherein the housing (9) comprises a first housing part (1) and a second housing part (2) that is preferably designed as a cover, and wherein a second seal (16) is located in the contact area of the first housing part (1) and the second housing part (2), wherein said seal seals off the first housing chamber (4) from the second housing chamber (5).

2. The device according to claim 1, wherein the third housing chamber (6) is delineated by a side of the carrier (3) furthest from the sensor element (31) and the interior wall (18) of a recess that is formed on an inner side (19) of the first housing part (1) closest to the carrier (3) and that is interconnected with the second pressure channel (11) or farms said pressure channel.

3. The device according to claim 2, wherein a first seal (15) is located between the inner side (19) of the first housing part (1) closest to the carrier (3) and the side of the carrier (3) furthest away from the sensor element (31), which said seal seals off the third housing chamber (6) from the first housing chamber (4).

4. The device according to 3, wherein the first seal (15) and/or the second seal (16) are each formed by a seal bond and, in particular, by a bead of adhesive.

5. The device according to claim 4, wherein the first seal bond (15) and/or the second seal bond (16) are each located substantially in one plane.

6. The device according to claim 1, wherein the first pressure connection (12) and the second pressure connection (10) are formed on the first housing part (1).

7. The device according to claim 1, wherein the second seal (16) comprises a circumferential sealing section (16a) in the contact area of the first housing part (1) and the second housing part (2), and an inner sealing section (16b) that overlaps the circumferential sealing section (16a) in the manner of a bridge, which said inner sealing section (16b) seals off the transition region between the carrier (3) and a separating wall (22) that is formed on the second housing part (2) and separates the first housing chamber (4) from the second housing chamber (5).

8. The device according to claim 1, wherein the first pressure connection (12) and the second pressure connection (10) project outwardly from a common side of the first housing part (1).

9. The device according to claim 1, wherein the first pressure connection (12) projects outwardly from the first housing part (1) at a right angle to a second pressure connection (10).

10. The device according to claim 1, wherein the EMC-protective capacitors (35) are located inside the second housing chamber (5) on the carrier (5).

11. The device according to claim 1, wherein the device is configured as a pressure differential sensor.

12. A device for measuring pressure having a housing (9) in which a carrier (3) equipped with a sensor element (31) and electrical connection elements (34) is located, which said housing (9) comprises a first housing chamber (4) that encloses the sensor element (31) and is connected with a first pressure channel (13) of a first pressure connection (12), and which said housing comprises a second housing chamber (5) that is sealed off from the first housing chamber (4) and encloses at least the electrical connection elements (34), wherein the housing (9) comprises a third housing chamber (6) that is sealed off from the first housing chamber (4) and the second housing chamber (5), which said third housing chamber is interconnected with a second pressure channel (11) of a second pressure connection (10), wherein the housing (9) comprises a first housing part (1) and a second housing part (2) that is preferably designed as a cover, and wherein a second seal (16) is located in the contact area of the first housing part (1) and the second housing part (2), which said seal seals off the first housing chamber (4) from the second housing chamber (5), and wherein the third housing chamber (6) is delineated by a side of the carrier (3) furthest from the sensor element (31) and the interior wall (18) of a recess that is formed on an inner side (19) of the first housing part (1) closest to the carrier (3) and that is interconnected with the second pressure channel (11) or forms said pressure channel.

* * * * *